US005424427A

United States Patent [19]

Arnost

[11] Patent Number: 5,424,427

[45] Date of Patent: Jun. 13, 1995

[54] TRIAZINE INCLUDING SUBSTITUTED COLOR-PROVIDING MOIETY

[75] Inventor: Michael J. Arnost, Andover, Mass.

[73] Assignee: Polaroid Corporation, Cambridge, Mass.

[21] Appl. No.: 201,456

[22] Filed: Feb. 24, 1994

Related U.S. Application Data

[62] Division of Ser. No. 994,897, Dec. 22, 1992, Pat. No. 5,320,929.

[51] Int. Cl.[6] .................... C09B 57/00; C09B 62/04; G03C 5/54

[52] U.S. Cl. .................... 544/198; 430/203

[58] Field of Search .................... 544/198; 430/638

[56] References Cited

U.S. PATENT DOCUMENTS

| | | | |
|---|---|---|---|
| B 351,673 | 1/1975 | Fleckenstein et al. | 96/3 |
| 3,053,656 | 9/1962 | Corley | 96/29 |
| 3,719,489 | 3/1973 | Cieciuch et al. | 96/29 |
| 4,098,783 | 7/1978 | Cieciuch et al. | 260/147 |
| 4,468,448 | 8/1984 | Rogers | 430/222 |
| 4,468,449 | 8/1984 | Arbree et al. | 430/222 |
| 4,515,888 | 5/1985 | Beretta et al. | 544/198 X |
| 4,833,249 | 5/1989 | Abou-Gharbia et al. | 544/198 X |
| 4,871,654 | 10/1989 | Vanmaele et al. | 430/512 |

FOREIGN PATENT DOCUMENTS

| | | | |
|---|---|---|---|
| 579038 | 7/1959 | Canada | 430/220 |
| 0173404 | 3/1986 | European Pat. Off. | 430/222 |
| 0292618 | 11/1988 | European Pat. Off. | 430/222 |
| 59-180548 | 10/1984 | Japan | 430/222 |

*Primary Examiner*—Floyd D. Higel
*Attorney, Agent, or Firm*—Edward W. Black

[57] ABSTRACT

There are disclosed compounds comprising at least one cyclic 1,3-sulfur-nitrogen substituted color-providing material and at least one ballast group which are linked to each other through a triazine group. The compounds are capable of releasing the color-providing material upon cleavage in the presence of silver ions or a soluble silver complex. The color-providing compounds are useful as image-forming materials in color thermographic, photothermographic and other photographic processes.

12 Claims, No Drawings

TRIAZINE INCLUDING SUBSTITUTED COLOR-PROVIDING MOIETY

RELATED APPLICATIONS

This application is a divisional of copending U.S. patent application Ser. No. 07/994,897, filed Dec. 22, 1992, now U.S. Pat. No. 5,320,929.

BACKGROUND OF THE INVENTION

1. Field of the Invention

This invention relates to image-forming materials, specifically to color-providing compounds which, in the presence of silver ions and/or a soluble silver complex, undergo a cleavage reaction to liberate one or more color-providing moieties.

2. Description of the Related Art

U.S. Pat. No. 3,719,489 discloses silver ion assisted cleavage reactions useful in photographic systems. As disclosed therein, photographically inert compounds are capable of undergoing cleavage in the presence of silver ions made available imagewise during processing of a silver halide emulsion to liberate a reagent, such as, a photographically active reagent or a dye in an imagewise distribution corresponding to that of said silver ions. In one embodiment disclosed therein, color images are produced by using as the photographically inert compounds, color providing compounds which are substantially non-diffusible in the photographic processing composition but capable of undergoing cleavage in the presence of the imagewise distribution of silver ions and/or soluble silver complex made available in the undeveloped and partially developed areas of a silver halide emulsion as a function of development to liberate a more mobile and diffusible color-providing moiety in an imagewise distribution corresponding to the imagewise distribution of said ions and/or said complex. The subsequent formation of a color image is the result of the differential in diffusibility between the parent compound and liberated color-providing moiety whereby the imagewise distribution of the more diffusible color-providing moiety released in the undeveloped and partially developed areas is free to transfer.

Color-providing compounds useful in the above process form the subject matter of U.S. Pat. No. 4,098,783, a continuation in part of said U.S. Pat. No. 3,719,489. The color-providing compounds disclosed therein may comprise one or more dye radicals and one or more 1,3-sulfur-nitrogen moieties. For example, they may comprise one complete dye or dye intermediate and one cyclic 1,3-sulfur-nitrogen moiety. Alternatively, the color-providing compounds may comprise two or more cyclic moieties for each dye radical or dye intermediate and vice versa. Particularly useful dye-providing compounds disclosed therein comprise a dye containing from 1 to 4 and preferably 1 or 2 cyclic 1,3-sulfur-nitrogen groups and may be represented by the formula $$D\text{-}[(L)_{m-1}\text{-}Y]_n \qquad (A)$$

wherein D represents a dye radical, i.e., the radical of an organic dye possessing at least one carbon atom, L is a divalent organic linking group containing at least one carbon atom, m is a positive integer 1 or 2, n is a positive integer from 1 to 4, and Y is a cyclic 1,3-sulfur-nitrogen group.

U.S. Pat. No. 4,468,448 discloses a different class of 1,3-sulfur-nitrogen compounds which, rather than relying on the differential in diffusibility between the colored parent compound and the liberated dye to form the color image, as in the aforementioned U.S. Pat. No. 3,719,489, utilize the ability of 1,3-sulfur-nitrogen compounds to undergo silver ion assisted cleavage to provide an imagewise distribution of a colored image dye from a substantially colorless precursor of a preformed image dye. This is accomplished by employing a 1,3-sulfur-nitrogen group, to maintain said precursor in its substantially colorless form until said 1,3-sulfur-nitrogen group undergoes cleavage. The color image may be formed by using the imagewise cleavage of the 1,3-sulfur-nitrogen group to provide the image dye directly, or the imagewise cleavage of the 1,3-sulfur-nitrogen group may be used to activate a subsequent reaction or series of reactions which in turn provide the image dye.

Thermally developable black and white as well as color photosensitive materials, whose development is effected by heating, are well known. Among the systems designed to give color images are those wherein a diffusible dye is released as a result of the heat development of an organic silver salt and transferred to the image-receiving layer, whereby a color image is obtained.

Japanese Kokai 59-180548 having a Laid-Open date of Oct. 13, 1984, discloses a heat-developable silver halide photosensitive imaging system wherein the dye-providing material contains a heterocyclic ring containing a nitrogen atom and a sulfur or selenium atom which heterocyclic ring is subject to cleavage in the presence of silver ions to release a diffusible dye. An example of a suitable dye-providing material is a thiazolidine dye such as disclosed in the aforementioned U.S. Pat. No. 4,098,783. The process involves imagewise exposing the photosensitive system to light and subsequently or simultaneously heating the photosensitive system under a substantially water-free condition, in the presence of a base or base precursor, whereby an oxidation-reduction reaction between the exposed photosensitive silver halide and a reducing agent occurs. In the exposed areas a negative silver image is formed. In the unexposed areas, the silver ion, present in inverse proportion to the silver image, causes the heterocyclic ring of the dye-providing material to be cleaved releasing a diffusible dye. The diffusible dye is then transferred to an image-receiving layer whereby a positive dye image is formed.

While the differential in diffusibility between the parent compound and the liberated color-providing moiety, disclosed in the aforementioned U.S. Pat. No. 3,719,489, is useful in obtaining a color image, under some conditions a small amount of the parent compound may also transfer. Thus, in color diffusion transfer film products wherein the parent compound comprising a colored image dye-providing moiety is itself colored, non-imagewise diffusion during processing of even a minimal amount of the parent compound to a receptive layer of the film unit can adversely affect the quality of the image, particularly in the Dmin, i.e., highlight, areas of the image. This has been found to be a particularly acute problem in thermally developed silver halide photographic systems.

One way to lessen the diffusion of uncleaved dye-providing material is to use additional dye providing radicals as ballast groups as described, e.g. in the copending U.S. patent application, Ser. No. 07/923,843 of M. Arnost et al filed Jul. 31, 1992, now U.S. Pat. No. 5,316,638. Another way to lessen the diffusion of uncleaved dye-providing material is to add additional ballasting groups and/or to increase the size of the ballast groups. However, adding more than one ballast group can pose difficulties in synthesizing the multi ballasted color-providing compounds.

The copending U.S. patent application, Ser. No. 07/995,026 (now U.S. Pat. No. 5,284,638), of E. Chinoporos et al. filed on even date herewith, (now abandoned in favor of C.I.P. Pat. No. 5,340,689), discloses cyclic 1,3-sulfur-nitrogen dye-providing compounds made substantially immobile by the addition of one or more ballasting groups.

The present invention is concerned with decreasing the diffusion of a particular color-providing compound by using additional color-providing radicals and/or ballast group(s).

SUMMARY OF THE INVENTION

According to the present invention, color-providing compounds are provided which utilize 1,3,5-triazine as a multivalent linking group to link one or more cyclic 1,3-sulfur-nitrogen substituted color-providing compounds with one or more ballast groups. Specifically, the color-providing compounds of the present invention are represented by the general formula

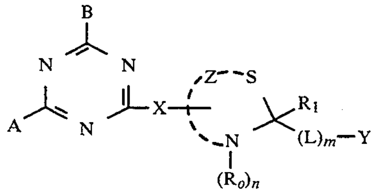

Formula I wherein:

Y represents a color-providing group; L represents a divalent organic linking group containing at least one carbon atom; m is 0 or 1; $R_0$ is hydrogen or a monovalent organic radical; $R_1$ represents hydrogen, a monovalent organic radical or together with L represents the atoms necessary to complete a spiro union with the cyclic 1,3-sulfur-nitrogen group when m is 1 or together with Y represents the atoms necessary to complete a spiro union with the cyclic 1,3-sulfur-nitrogen group when m is 0; Z represents the carbon atoms necessary to complete an unsubstituted or substituted 5- or 6-membered heterocyclic ring system; X represents a divalent chemical linkage joining the cyclic 1,3-sulfur-nitrogen moiety through the N atom or a carbon atom of Z to the triazine linking group provided that when the linkage is through the N atom, n=0, otherwise n=1; and A and B, the same or different, each represent hydrogen, halo, e.g. chloro, amino, hydroxy, alkoxy or alkyl, a ballast group or

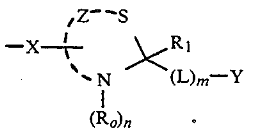

provided at least one of A or B is a ballast group or

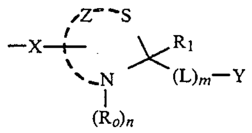

The present invention also provides for photographic, photothermographic and thermographic imaging materials using the above described color-providing materials.

Other objects of the invention will in part be obvious and will in part appear hereinafter.

The invention accordingly comprises the processes involving the several steps and relation and order of one or more of such steps with respect to each of the others, and the product and compositions possessing the features, properties and relation of elements which are exemplified in the-following detailed disclosure, and the scope of the application of which will be indicated in the claims.

For a fuller understanding of the nature and objects of the invention, reference should be had to the following detailed description.

DETAILED DESCRIPTION OF THE INVENTION

The term color-providing group is used herein to mean a complete dye or dye intermediate capable of yielding a complete dye upon subsequent reaction. The term "complete dye" is used herein to mean a dye radical comprising the chromophoric system of a dye.

The color-providing group, Y, according to the present invention may be a complete dye or dye intermediate capable of yielding a complete dye upon subsequent reaction, for example, upon reaction with a suitable coupler to form a complete dye. The coupling reaction may take place directly after cleavage of the cyclic 1,3-sulfur-nitrogen group to liberate the dye intermediate, or it may take place after diffusion of the dye intermediate to, e.g., an image-receiving layer.

Complete dyes which may be used in the present invention include any of the general classes of dyes heretofore known in the art, for example, nitro, thiazole, cyanine, di- and triphenylmethane, anthrapyridone, azo, anthraquinone, phthalocyanine and metal complexed azo, azomethine and phthalocyanine dyes. Specific radicals of organic dyes that may be used include the dye radicals comprising the dye portion of the dye developers disclosed in U.S. Pat. Nos. 3,076,808; 3,076,820; 3,134,762; 3,134,763; 3,134,764; 3,134,765; 3,135,734; 3,173,906; 3,186,982; 3,201,384; 3,208,991; 3,209,016; 3,218,312; 3,236,864; 3,236,865; 3,246,016; 3,252,969; 3,253,001; 3,255,206; 3,262,924; 3,275,617; 3,282,913; 3,288,778; 3,299,041; 3,303,183; 3,306,891; 3,337,524; 3,337,589; 3,357,969; 3,365,441; 3,424,742; 3,482,972; 3,491,127; 3,544,545; 3,551,406; 3,597,200; 3,752,836; 4,264,701; and 4,267,251. Preferred dyes are the azomethine, indoaniline, indamine, and indophenol dyes, i.e., coupler dyes formed by the oxidative coupling of a phenylene diamine with a color coupler.

The dye intermediates which may be used as the color-providing group may comprise any molecule which when released is capable of forming a dye upon reaction with another molecule. For example, see U.S. Pat. No. 3,719,488, which discloses the use of 1,3-sulfur-nitrogen compounds to provide the imagewise distribution of dye intermediate and/or color-forming reagent, e.g., a colorless aldehyde or ketone dye intermediate which, when released is capable of reacting with a color-forming reagent, such as a methylene coupler, to form a complete dye.

In addition to the above, useful color-providing moieties include compounds which are colorless or of a color other than that ultimately desired in a certain environment, e.g. indicator dyes and leuco dyes. Indicator dyes, upon a change in environment, e.g., from acid to alkaline conditions, take on a color change. Leuco dyes are usually colorless, but change to a colored form upon e.g., oxidation. It is also contemplated that dyes may be employed which undergo a color shift or change in spectral absorption characteristics during or after processing. Such dyes may be referred to as 'temporarily shifted' dyes. The temporary shift may, for example, be effected by acylation, the acyl group being removable by hydrolysis in an alkaline environment, see for example, U.S. Pat. No. 4,535,051. The temporary shift may be effected by an amide group which undergoes an intramolecular cleavage to form a colored image dye such as disclosed in U.S. Pat. No. 4,468,451; or the temporary shift may be effected such that the colorless precursor undergoes a $\beta$-elimination reaction following the imagewise cleavage of the cyclic 1,3-sulfur-nitrogen group to form an image dye as disclosed in U.S. Pat. No. 4,468,449 or the colorless precursor undergoes a $\beta$-elimination reaction which generates a group capable of undergoing an intramolecular accelerated nucleophilic displacement reaction to provide an image dye as described in U.S. Pat. No. 4,468,450. It is also within the scope of the present invention to employ metal complexed or metal complexable dyes and to employ dyes, the non-complexed forms of which are substantially colorless, but which, when complexed during or subsequent to image formation, are of the desired color.

The choice of color-providing group is primarily limited by the spectral characteristics it is desired to have in the dye product comprising

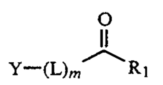

wherein Y, L, m and $R_1$ are as defined herein.

The color-providing group, Y, may be linked directly to the carbon atom of the respective 1,3-sulfur-nitrogen ring system by a single covalent bond, an ionic bond or through a spiro union, depicted in Formula I when m=0, or it may be linked indirectly to the ring systems through an appropriate linking group, L, either acyclic or cyclic or a combination thereof, depicted in Formula I when m=1. The linking group, L, may be any divalent organic radical possessing at least one carbon atom for attachment to the cyclic 1,3-sulfur-nitrogen group either by a single covalent bond or by a spiro union.

Linking groups are well-known in the photographic art, and as discussed in U.S. Pat. Nos. 2,983,606 and 3,255,001, they are used to unite a dye radical of a desired predetermined color with a group possessing a silver halide developing function to obtain a dye developer. Ordinarily, the linking group functions as an insulating linkage to prevent or interrupt any system of conjugation-or resonance extending from the dye radical comprising the chromophoric system of a dye to the developer group. The linking groups used in the dye developer art, either insulating or non-insulating, are also useful in the present invention for uniting the dye radical with the cyclic sulfur-nitrogen group, and divalent organic radicals appropriate for use in the present invention may be selected from those disclosed in U.S. Pat. No. 3,255,001 and those disclosed in the patents referred to above as showing useful dye radicals.

Preferably, the linking groups used in the subject color-providing compounds to connect the color-providing group, Y, to the cyclic 1,3-sulfur-nitrogen group comprise a divalent hydrocarbon residue, e.g., alkyl groups, e.g., $(-CH_2-)_3$, $(-CH_2-)_4$, cycloalkyl groups, aralkyl groups, e.g., $-CH_2-Ar-$ wherein Ar represents aryl and alkaryl groups, e.g., $-CH_2-Ph-CH_2-$ where Ph represents a substituted or unsubstituted phenyl ring, or —CONH—; alkyl —CONH—; and aryl—CONH—. Alkyl and aralkyl groups have been found to be particularly useful linking groups in the present invention.

Z in Formula I, as stated above, represents the atoms necessary to complete either a substituted or unsubstituted 5- or 6-membered heterocyclic ring. Preferably, the heterocyclic ring is a thiazolidine (II) or benzothiazolidine (III) ring, represented by the formulae below:

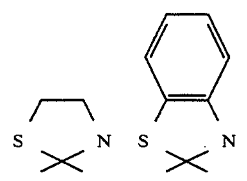

wherein the above formulae are intended to also include the corresponding substituted thiazolidines and benzothiazolidines.

The chemical linkage, X, joins the cyclic 1,3-sulfur-nitrogen group to the triazine linking group as shown in FIG. I, above. The cyclic 1,3-sulfur-nitrogen group may be joined to the triazine group through its nitrogen atom or through a carbon atom of Z. When the cyclic 1,3-sulfur-nitrogen group is linked to the triazine through a carbon atom of Z, n=1 and $R_0$ is hydrogen or a monovalent organic radical provided the monovalent organic radical does not contain a strongly electron withdrawing group, e.g. carbonyl or sulfonyl, attached directly to the nitrogen atom. X may be a single covalent bond, as where the atom of the cyclic 1,3-sulfur-nitrogen group is directly joined to the triazine group by a shared pair of electrons, or it may be a divalent organic group, i.e., an organic group having two free valences for attaching the respective atom of the 1,3-sulfur-nitrogen group to the triazine group by single covalent bonds. Preferably, the chemical linkage, X, is a divalent organic group. It is important to note that when the chemical linkage, X, joins the cyclic 1,3-sulfur-nitrogen moiety through its N atom to the triazine group, the chemical linkage cannot be a single covalent bond as defined above and the chemical linkage cannot contain a carbonyl, sulfonyl or other strongly electron withdrawing group directly attached to the N atom of the 1,3-sulfur-nitrogen group. A strongly electron withdrawing group in that position deactivates the 1,3-sulfur-nitrogen ring so that it is not very susceptible to cleavage in the presence of silver ions and/or a soluble silver complex.

As examples of suitable chemical linkages, X, which may be used to form the color-providing compounds within the scope of the present invention, mention may be made of the following:

(a shared pair of electrons);

—NH—R—O—CO—R—, wherein R is a bivalent hydrocarbon residue, e.g., alkyl or aryl usually containing 1 to 20 carbon atoms;

—NH—R—NH—CO—R—;

—NH—R—NH—CO—R'—;

—NH—CO—R—;

—NH—R—NH—;

—O—R—NH—;

—O—R—O—;

—O—R—O—CO—;

—R—;

—R—O—R—;

—R—O—R'—, wherein R' is a bivalent hydrocarbon residue, e.g., alkyl or aryl usually containing 1 to 20 carbon atoms, different from R;

—R—O—R'—O—R—;

—R—O—R'—O—R"—, wherein R" is a bivalent hydrocarbon residue, e.g., alkyl or aryl usually containing 1 to 20 carbon atoms, different from R and R';

—Ar—CO—NH—R—O—R'—O—R—NH—CO—Ar—, wherein Ar represents aryl;

—R—CONH—R'—NH—CO—R—

—R—NH—$SO_2$—R—$SO_2$—NH—R—;

—R—NH—$SO_2$—R'—$SO_2$—NH—R—;

—R—NH—$SO_2$—R'—$SO_2$—NH—R"—.

The aryl and alkyl groups referred to above are intended to also include corresponding substituted groups.

The function of the ballast groups is to insolubilize or immobilize the dye-providing compounds to render them substantially non-diffusible during processing. The selection of a particular ballast group will depend on a number of factors, e.g., on the particular imaging system in which the color-providing compounds are to be used and whether it is desired to employ only one ballast group or to employ two or more groups capable of insolubilizing or immobilizing the compound. Where two or more groups are employed to render the dye-providing compound-substantially non-diffusible, lower alkyl radicals may be used. Where only one group is used for ballasting, it is more effective to employ, for example, a higher alkyl radical, such as decyl, dodecyl, lauryl, stearyl, and oleyl; —N—(alkyl)$_2$; or a carbocyclic or heterocyclic ring having 6 members or more. Where cyclic compounds are employed, the carbocyclic or heterocyclic ballast group may be bonded to a single atom or to adjacent atoms of the parent molecule and may be bonded to a single atom by a valence bond or through a spiro union.

A preferred embodiment of the color-providing compounds of the present invention is represented by

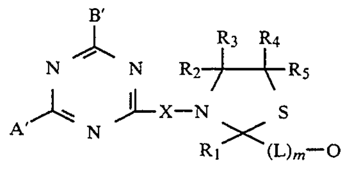

wherein X, $R_1$, L and m are as defined above, A' and B', the same or different, represent a ballast group or

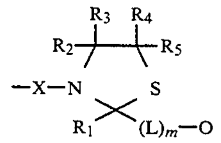

$R_2$, $R_3$, $R_4$ and $R_5$ are each hydrogen, a monovalent organic radical or taken together, $R_2$ and $R_3$ or $R_4$ and $R_5$ represent a substituted or unsubstituted carbocyclic or heterocyclic ring, and D represents a dye radical, i.e., a dye radical of an organic dye. Particularly useful dye radicals include those comprising the chromophoric system of an azomethine, indoaniline, indamine, and indophenol dye, e.g., a coupler dye radical formed by oxidative coupling of a phenylene diamine with a color coupler. Examples of coupler dyes include those described in U.S. Pat. No. 4,952,479 and J. Bailey and L. A. Williams, *The Chemistry of Synthetic Dyes,* Vol. IV, Academic Press, New York, Chapter VI, 1971, pp. 341–387 and James, T. H., *The Theory of the Photographic Process,* fourth ed., MacMillan Publishing Co., Inc., New York, 1977, pp. 335–362.

While a particular color-providing compound may be useful in one imaging system, it may need to be modified for use in another. This could be due to, among other things, differences in solubility and/or diffusibility of the color-providing compound and/or the released color-providing moiety within the various imaging systems. However, one of skill in the art will be able to modify the color-providing compounds by choice of substituents, e.g. solubilizing groups, so that they will function as desired in a particular system.

Illustrative examples of the color-providing compounds within the scope of the present invention are set out in the Formulae below:

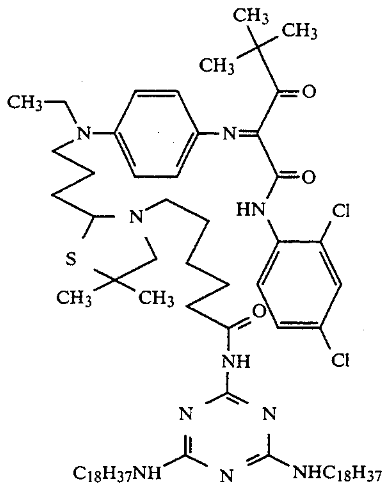
(i)
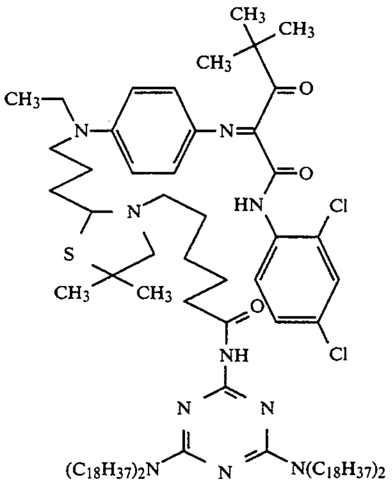
(Ii)
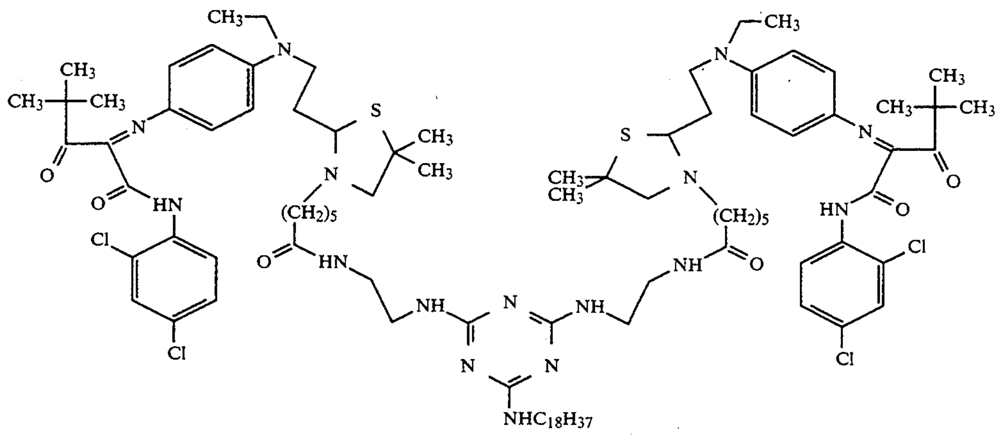
(iii)

-continued
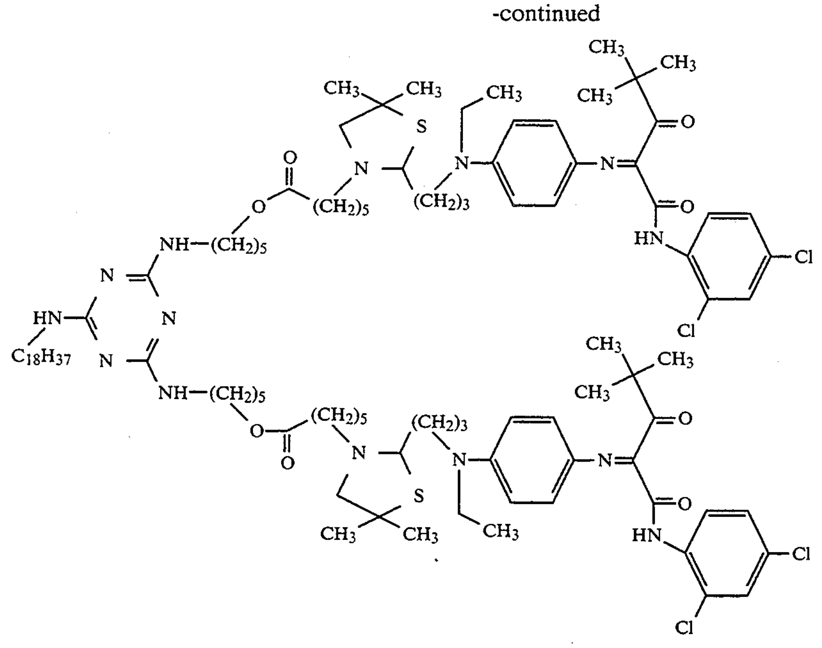
(iv)
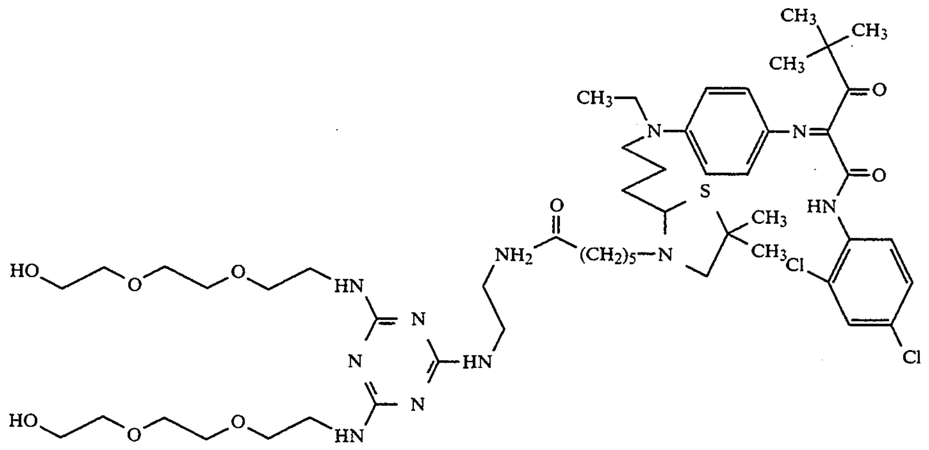
(v)
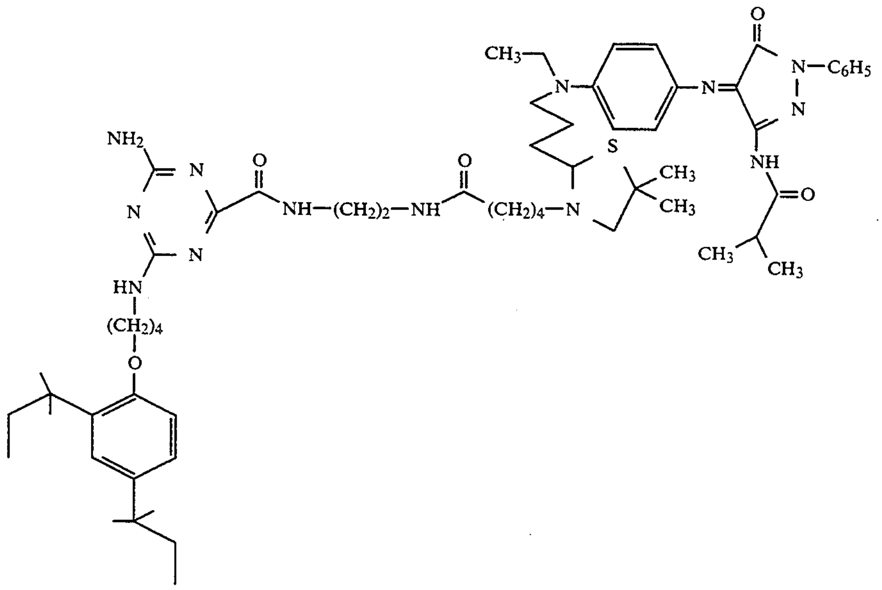
(vi)

-continued
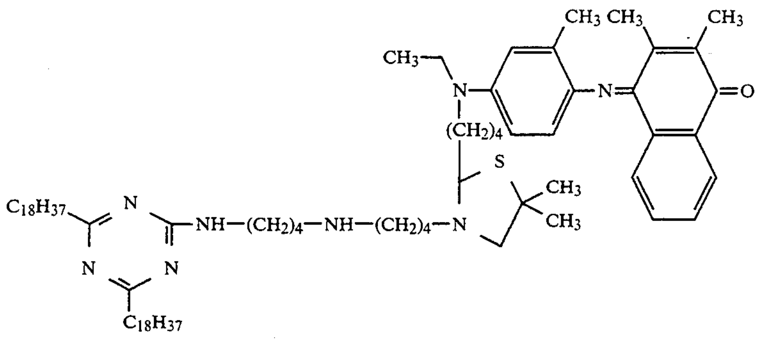
(vii)
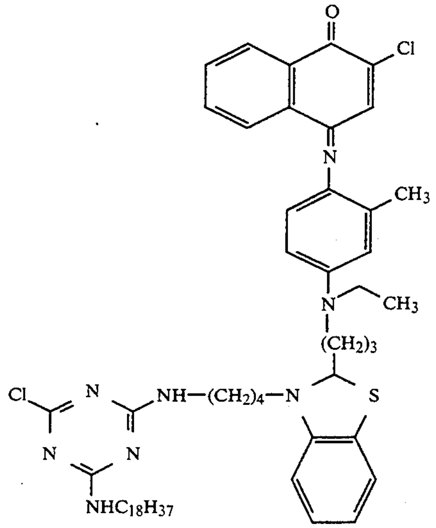
(viii)
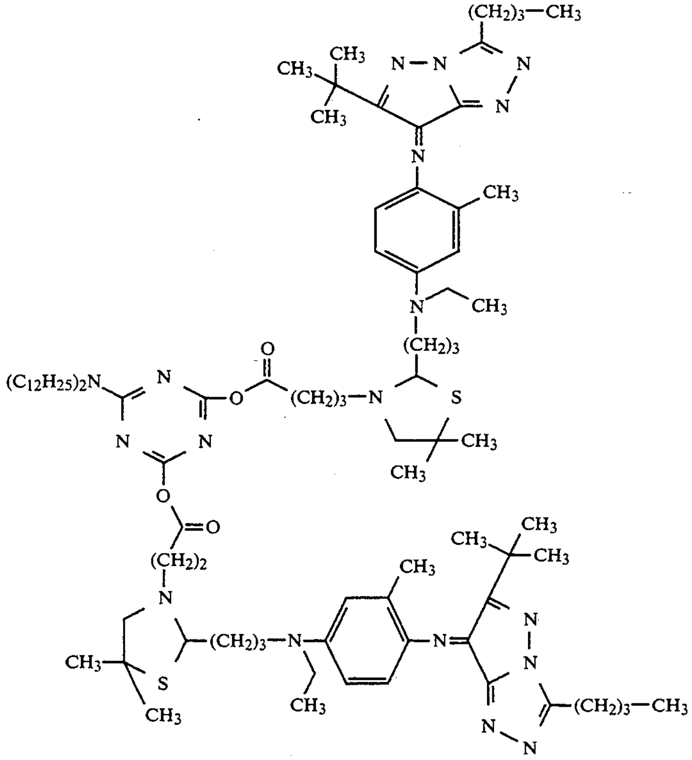
(ix)

-continued (x)

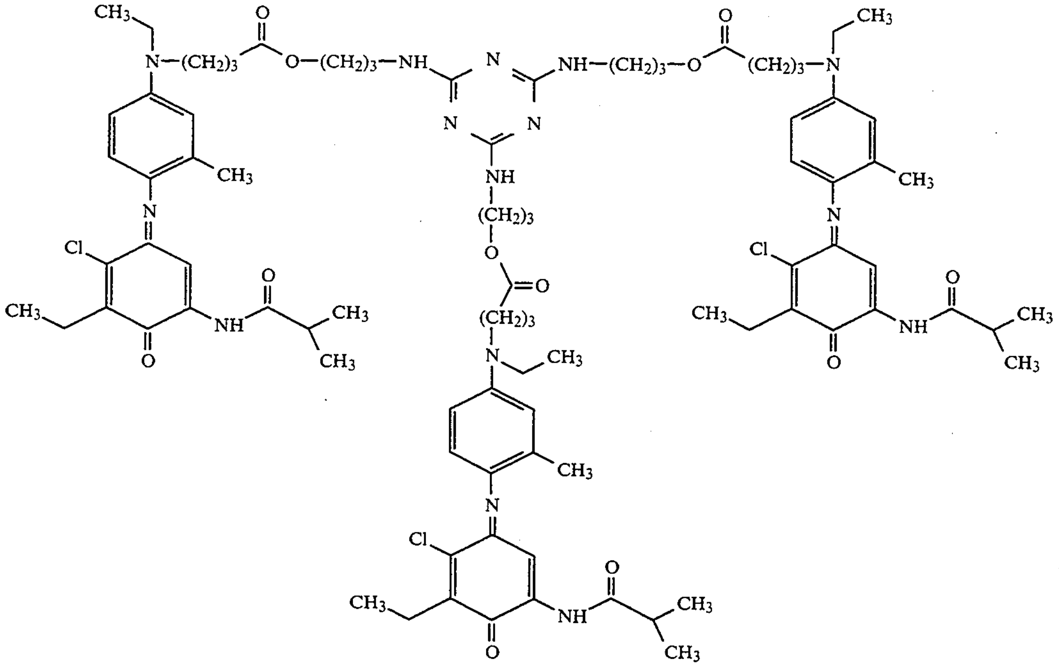

(xi)

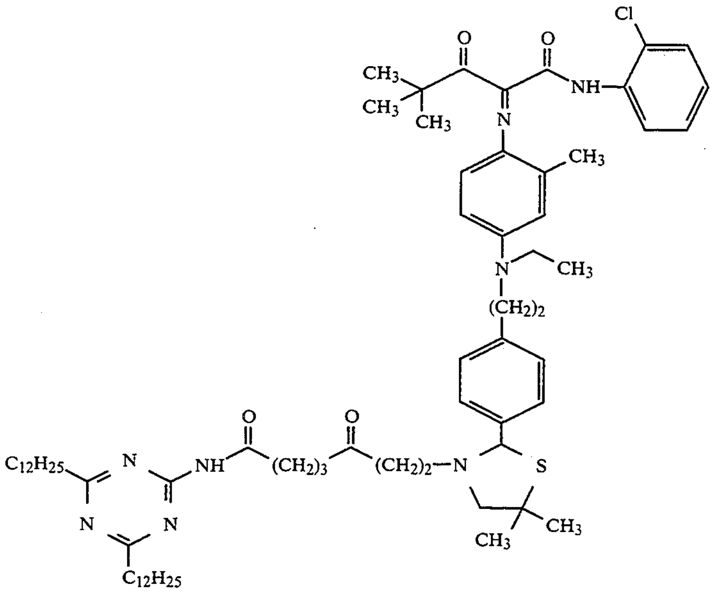

The compounds of the present invention can be prepared by the addition of the ballast groups and cyclic 1,3-sulfur-nitrogen substituted color-providing materials to melamine or cyanuric chloride using reactions which are known in the art and these will be apparent particularly in view of the specific examples provided herein.

The cyclic 1,3-sulfur-nitrogen substituted color-providing materials may be synthesized by condensing an aldehyde- or ketone-substituted dye (or other color-providing moiety) with an appropriately substituted aminoalkylthiol as described in the aforementioned U.S. Pat. No. 4,098,783. The substituted aminoalkylthiol compounds may be prepared by procedures well-known in the art such as by the nucleophilic ring opening of a thioepoxide such as described in R. Luhowy et al, J. Org. Chem. 38 (13), 2405-2407 (1973).

Still other procedures for preparing the subject compounds and variations of those given above will be apparent to those skilled in the art.

The following detailed examples are given to illustrate the preparation of the color-providing compounds within the scope of this invention, and are not intended to be in any way limiting.

EXAMPLE 1

Preparation of the compound of Formula (i).

4.0 g of the thiazolidine dye having the structure

A

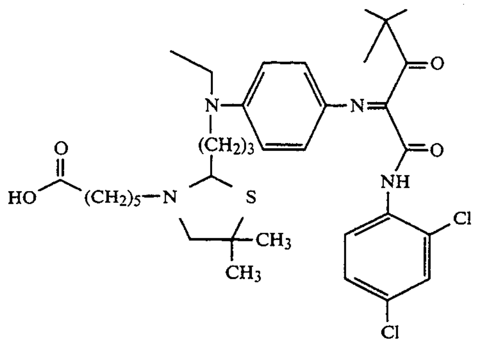

was dissolved in 100 mL of methylene chloride ($CH_2Cl_2$). 0.64 g of triethylamine was added and the mixture was cooled to 0° C. under a nitrogen atmosphere. Pivaloyl chloride, 0.76 g was introduced dropwise and the resulting solution was stirred at 0° C. for one hour. The reaction mixture was allowed to warm to room temperature, at which point 4.0 g of 1-amino-3,5-bis(octadecylamine)-2,4,6-triazine was added, followed by the addition of 0.64 g of triethylamine. The resulting mixture was stirred at room temperature overnight. 100 mL of water was added to the mixture. The organic layer was separated, dried over sodium sulfate, filtered to remove the sodium sulfate and concentrated in vacuo. The residue was purified by column chromatography (silica gel) using 5% methanol/$CH_2Cl_2$ as eluent to yield 3.6 g of the title color-providing compound. The structure was confirmed by NMR and mass spectroscopy.

The 1-amino-3,5-bis(octadecylamine)-2,4,6-triazine used above was prepared according to the procedure for 1-amino-3,5-bis(dioctadecylamine)-2,4,6-triazine, described below, by substituting octadecylamine in place of the dioctadecylamine.

Thiazolidine Dye A used above was prepared according to the procedure described in the aforementioned copending U.S. patent application, Ser. No. 07/925,026 (now U.S. Pat. No. 5,284,638) filed on even date herewith, for preparing the compound of Formula (iv) therein using the appropriately substituted 2-aminoethanethiol.

The color-providing compound of Formula (ii) was prepared in accordance with the foregoing procedure by substituting 1-amino-3,5-bis(dioctadecylamine)-2,4,6-triazine in place of 1-amino-3,5-bis(octadecylamine)-2,4,6-triazine. The 1-amino-3,5-bis(dioctadecylamine)-2,4,6-triazine was prepared as follows:

4.42 g of melamine, 40.66 g of dioctadecylamine and 4.37 g of ammonium chloride were combined and stirred at 300° C. for 6 hours. The mixture was then cooled to room temperature and 200 mL of a saturated sodium bicarbonate solution was added. The resulting mixture was heated to 70° C. for 30 minutes and then allowed to sit at room temperature overnight. The precipitate which had formed was filtered and combined with 200 mL of isopropanol. The resulting mixture was heated to 80° C. and then allowed to cool to room temperature with stirring. The precipitate which had formed was filtered, washed with chilled isopropanol and allowed to air dry over the weekend to yield 30.24 g of 1-amino-3,5-bis(dioctadecylamine)-2,4,6-triazine. The structure was confirmed by NMR, IR and mass spectroscopy.

The color-providing compound of formula (iii) was prepared by a procedure similar to that of Example 1 by substituting 1,3-bis(2-aminoethylamine)-5-octadecylamine-2,4,6-triazine in place of 1-amino-3,5-bis(octadecylamine)-2,4,6-triazine and doubling the quantity of thiazolidine dye A. Similarly, the color-providing compound of formula (iv) was prepared by substituting 1,3-bis(5-hydroxypentylamine)-5-(octadecylamine)-2,4,6-triazine.

The 1,3-bis(2-aminoethylamine)-5-octadecylamine-2,4,6-triazine used to synthesize the color-providing compound of formula (iii) was prepared as follows:

9.4 g of cyanuric chloride, 4 g of magnesium oxide, 150 mL $CH_2Cl_2$ and 50 mL of tetrahydrofuran (THF) were combined and cooled to 0° C. To the resulting slurry was added a solution of 10.8 g octadecylamine in 100 mL hexane and 100 mL $CH_2Cl_2$. The resulting mixture was stirred at 0° C. for 1.5 hours. The mixture was warmed to 25° C. and was then stirred for 14 hours. The white precipitate which had formed was filtered. The mother liquor was concentrated in vacuo to yield 15 g of 3,5-dichloro-1-octadecylamine-2,4,6-triazine which was dissolved in 75 mL of THF. To the rapidly stirred THF solution was added, dropwise, 60 mL ethylene diamine. The THF was distilled from the mixture, and the remaining mixture was then heated at 100° C. for 15 hours. After cooling, the mixture was poured into 500 mL water, causing a white precipitate to be formed. To the mixture was added 70 mL in sodium hydroxide and then the precipitate was filtered. The resulting sticky white precipitate was slurried in methanol, filtered and dried to yield 3.5 g 1,3-bis(2-aminoethylamine)-5-octadecylamine-2,4,6-triazine.

The 1,3-bis(5-hydroxypentylamine)-5-octadecylamine-2,4,6-triazine used to make the color-providing compound of formula (iv) was prepared as follows:

A mixture of 4.2 g 3,5-dichloro-1-octadecylamine-2,4,6-triazine (prepared as above), 2.1 g 5-aminopentanol and 2 g of triethylamine in 100 mL dioxane was refluxed for three hours, during which time a brownish oil precipitated out of the solution. After cooling the mixture, the liquid was decanted from the brown oil. The liquid was concentrated in vacuo to yield a white solid. The white solid was dissolved in 50 mL $CH_2Cl_2$, and 100 mL water was added. The white precipitate which had formed in the aqueous layer was filtered and dried in vacuo to yield 2.5 g of 1,3-bis(5-hydroxypentylamine)-5-octadecylamine-2,4,6-triazine.

In Formulae I and IV above, the heterocyclic ring moiety containing the group

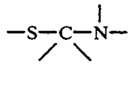

included in the ring undergoes cleavage between the S atom and the C atom common to the S and N atoms and between the N atom and the common C atom in the presence of silver ions or a soluble silver complex to release a color-providing moiety represented by

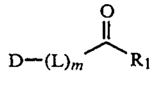

Formula V

As noted earlier, the color-providing compounds according to the present invention are useful for forming color images in thermographic imaging systems processed by imagewise heating and in photographic imaging systems utilizing silver halide wherein the method of processing employs either wet processing to develop the image or thermal processing which develops the image by heating.

Specifically, the present invention provides an image-recording material for use in a diffusion transfer color process comprising (a) one or more supports, each carrying in one or more layers a source of silver ions and a color-providing compound capable of releasing a diffusible color-providing moiety upon cleavage in the presence of silver ions, said color-providing compound represented by formula I above, and (b) on the same or a separate support, an image receiving layer capable of receiving the diffusible color-providing moiety released from said color-providing compound.

For photographic and photothermographic applications, the color photosensitive image-recording material includes a photosensitive silver halide which could also function as the silver ion source.

Preferably, in photothermographic systems the photosensitive image-recording material additionally contains a silver salt oxidizing material and a reducing agent for silver.

In another embodiment, the photothermographic and the thermographic color imaging-recording materials may also include an auxiliary ligand for silver. The use of auxiliary ligands in thermographic and photothermographic image-recording materials forms the subject matter of the copending U.S. patent application of J. R. Freedman, S. R. Sofen and K. M. Young, Ser. No. 07/923,858, filed Jul. 31, 1992, now abandoned.

As mentioned earlier, the color-providing compounds of the present invention are substantially non-diffusible in the thermographic, photographic and photothermographic materials but are capable of undergoing cleavage in the presence of the imagewise distribution of silver ions and/or soluble silver salt complex made available in the undeveloped and partially developed areas as a function of development to liberate a more mobile and diffusible color-providing moiety in a corresponding imagewise distribution.

For forming color images in photographic image-recording systems, a color-providing compound according to the present invention can be used in both monochrome and full-color imaging systems such as disclosed in the aforementioned U.S. Pat. No. 4,098,783, issued Jul. 4, 1978, and U.S. Pat. No. 3,719,489, issued Mar. 6, 1973, both of Ronald F. W. Cieciuch et al. Generally, a color-providing compound is associated with a light-sensitive silver halide emulsion which, after being exposed, is developed with an aqueous alkaline processing solution including a silver halide developing agent and a silver halide solvent. The imagewise distribution of silver ions such as contained in the soluble silver complex made available during processing of the emulsion migrates to the associated color-providing material which undergoes cleavage in the presence of the complex to release an imagewise distribution of the more diffusible color-providing moiety. The subsequent formation of a color image is the result of the differential in diffusibility between the color-providing compound and the liberated color-providing moiety whereby the imagewise distribution of the more diffusible color-providing moiety released in undeveloped and partially developed areas is free to transfer to the image-receiving layer. The color photographic image-recording materials using the compounds of this invention can be prepared in accordance with such procedures as described in the aforementioned U.S. Pat. No. 4,098,783, of Ronald F. W. Cieciuch et al issued Jul. 4, 1978, and the U.S. Pat. No. 3,719,489, of Ronald F. W. Cieciuch et al issued Mar. 6, 1973, the disclosures of both being herein incorporated by reference.

In addition to the full color photographic systems described above, the color-providing compounds of the present invention may be used as the image dye-releasing thiazolidines in subtractive color transfer films which utilize two different imaging mechanisms: dye developers and image dye-releasing thiazolidines as described in U.S. Pat. No. 4,740,448, issued Apr. 26, 1988, to Peter O. Kliem.

The color photothermographic image-recording materials using the compounds of this invention can be prepared in accordance with such procedures as disclosed in Research Disclosure No. 17029, issued June 1978. The thermographic image recording materials using the compounds of this invention can be prepared as described in the aforementioned copending U.S. patent application, Ser. No. 07/923,858, of J. R. Freedman et al (now abandoned) and the copending U.S. patent application, Ser. No. 07/994,898, (now abandoned) of J. R. Freedman et al filed on even date herewith.

The source of silver ions may be any of those materials commonly employed in the photographic art to provide silver ions provided the silver ion is made available imagewise upon processing to cleave the cyclic 1,3-sulfur-nitrogen moiety(ies) of the color-providing compound and release the diffusible color-providing moiety. Useful materials include silver halides and any of the silver salt oxidizing materials known in the art, such as those described in the aforementioned Research Disclosure No. 17029, issued June 1978. For thermographic applications, the silver salt complexes disclosed in the aforementioned copending U.S. patent application, Ser. No. 07/994,898, (now abandoned), of J. R. Freedman et al filed on even date herewith, are particularly useful.

The photosensitive silver halide used in the present invention may be any photosensitive silver halide employed in the photographic art, such as, silver chloride, iodide, bromide, iodobromide, chlorobromide, etc. and it may be prepared in situ or ex situ by any known method including adding a source of halide ions to the silver salt oxidizing material in a suitable vehicle such as described in the aforementioned Research Disclosure No. 17029.

The photosensitive silver halide emulsions used in the present invention may be spectrally sensitized by any known method in order to extend the photographic sensitivity to wavelengths other than those absorbed by the silver halide. Examples of suitable sensitizers include cyanine dyes, merocyanine, styryl dyes, hemicyanine dyes and oxonole dyes.

In addition to spectral sensitization, the silver halide emulsion may be chemically sensitized using any method known in the photographic art.

The silver halide emulsion is generally added to each photosensitive layer in an amount calculated to give a coated coverage in the range of 0.5 to 8.0 mmol/$m^2$, preferably 0.5 to 4.0 mmol/$m^2$.

As mentioned above, the source of silver ions may be any of the silver salt oxidizing materials known in the art provided they are relatively light stable and thermally stable under the processing conditions and provided further that they become available to cleave the color-providing material during processing. The silver salt oxidizing material is generally an organic silver salt or silver salt complex as heretofore known in the art. Any organic compound known in the photographic art to be useful for forming the organic silver salt may be employed, see, e.g., those described in U.S. Pat. No. 4,729,942. See U.S. Pat. No. 4,260,677, for useful silver salt complexes.

Examples of suitable silver salt oxidizing materials include silver salts of carboxylic acids, e.g., behenic and stearic acids and silver salts of compounds having an imino group. Preferred silver salts are the organic silver salts having an imino group. The silver salt of benzotriazole has been found to give good results in the heat-developable photosensitive systems of the present invention particularly when used with the auxiliary ligands described in more detail hereinafter.

The silver salt oxidizer used in the present invention can be prepared in a suitable binder by any known means and then used immediately without being isolated. Alternatively, the silver salt oxidizer may be isolated and then dispersed in a suitable binder.

The silver salt oxidizer is generally used in an amount ranging from 0.5 to 8.0 mmol/$m^2$and preferably from 0.5 to 4.0 mmol/$m^2$.

The reducing agents which may be used in the present invention may be selected from among those commonly used in heat-developable photographic materials. Illustrative reducing agents useful in the present invention include hydroquinone and its derivatives, e.g., 2-chlorohydroquinone; aminophenol derivatives, e.g., 4-aminophenol and 3,5-dibromophenol; catechol and its derivatives, e.g., 3-methoxycatechol; phenylenediamine derivatives, e.g., N,N-diethyl-p-phenylenediamine; and, 3-pyrazolidone derivatives, e.g., 1-phenyl-3-pyrazolidone and 4-hydroxymethyl-4-methyl-1-phenyl-3-pyrazolidone. The preferred reducing agents are 1-phenyl-3-pyrazolidone, commercially available under the tradename Phenidone, 4,4-dimethyl-1-phenyl-3-pyrazolidone, commercially available under the tradename Dimezone, and 4-hydroxymethyl-4-methyl-1-phenyl-3-pyrazolidone, commercially available under the tradename Dimezone-S.

The reducing agents may be used singly or in combination and they are generally employed in amounts ranging from 0.5 to 8.0 mmol/$m^2$, and preferably 1.0 to 4.0 mmol/$m^2$.

Thermal solvents are compounds which are solids at ambient temperature but which melt at the temperature used for processing. The thermal solvent acts as a solvent for various components of the heat-developable materials, it helps to accelerate thermal development and it provides the medium for diffusion of various materials including silver ions and/or complexes, reducing agents and the released color-providing moieties. Illustrative thermal solvents useful in the present invention include polar organic compounds such as the polyglycols described in U.S. Pat. No. 3,347,675, and the compounds described in U.S. Pat. No. 3,667,959. Particularly useful compounds include urea derivatives, e.g., dimethylurea, diethylurea and phenylurea; amide derivatives, e.g., acetamide, benzamide and p-toluamide; sulfonamide derivatives, e.g., benzenesulfonamide and α-toluenesulfonamide; and polyhydric alcohols, e.g., 1,2-cyclohexanediol and pentaerythritol. The thermal solvent designated TS-1 and having the structure

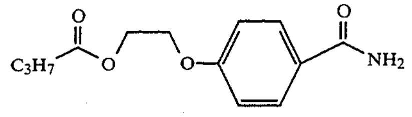

TS-1 has been found to give good results in the present invention.

The thermal solvent is generally incorporated on or in the image-receiving layer and/or in the photosensitive silver halide layer of the present invention. However, it may also be added to any intermediate layers and protective layers where necessary to obtain a desired result.

The thermal solvent is generally added in each layer in amounts ranging from 0.5 to 10.0 g/$m^2$, preferably 1.0 to 5.0 g/$m^2$.

The photosensitive silver halide emulsion layer(s) and other layers of the heat-developable photosensitive image-recording material may contain various materials as binders. Suitable binders include water soluble synthetic high-molecular weight compounds such as polyvinyl alcohol and polyvinylpyrrolidone and, synthetic or natural high-molecular weight compounds such as gelatin, gelatin derivatives, cellulose derivatives, proteins, starches and gum arabic. A single binder or mixture of binders may be used. Gelatin is the preferred binder for use in each layer.

The amount of binder used in each layer is generally 0.5 to 5.0 g/$m^2$, preferably 0.5 to 3.0 g/$m^2$.

The layers of the heat-developable photosensitive system according to the present invention which contain a crosslinkable colloid as a binder, e.g., gelatin, can be hardened by using various organic and inorganic hardeners such as those described in T. H. James, *The Theory of the Photographic Process,* 4th Ed., MacMillan, 1977, pp. 77–87. The hardeners can be used alone or in combination. It is preferred that the image-recording material according to the present invention contains a hardener in the photosensitive silver halide emulsion layer. Any suitable hardener known in the photographic art may be used, however, aldehyde hardeners, e.g. succinaldehyde and glyoxal, have been found to be particularly useful when gelatin is employed as the binder.

The hardeners are generally used in amounts ranging from 1 to 10% by weight of the total amount of gelatin coated.

The color-providing compound may be present in the same layer as the silver ion source including the photosensitive silver halide emulsion layer or in a layer on either side of the layer containing the silver ion source or the photosensitive emulsion layer. However, in photosensitive systems wherein the color-providing compound colored, it is generally preferred that the color-providing compound be placed so that exposure does not occur through it. If exposure is made through a colored color-providing compound, the color-providing compound may absorb light needed to expose the silver halide.

In certain instances, it may be desirable to separate the color-providing compound from the emulsion layer by a spacer layer. Where the particular color-providing compound chosen tends to be migratory during storage and/or thermal development of the heat-developable system, it is preferred that the color-providing compound be in a separate layer and more preferably, that it be in a layer furthest from the image-receiving layer.

The amount of color-providing compound used varies with the type chosen but generally an amount of 0.25 to 2.0 mmol/$m^2$ is used.

The color-providing compounds may be incorporated into the thermosensitive layer(s) of the heat-developable photosensitive and thermographic systems by any suitable method. For example, the color-providing compounds can be dissolved in a low boiling and/or high boiling solvent and dispersed in the binder, they can be dispersed in aqueous solutions of suitable polymers, e.g., gelatin, by means of a ball mill, or they can be solvent coated using any organic solvent that will also dissolve the binder, e.g., trifluoroethanol or dimethylsulfoxide (DMSO) can be used as solvents for gelatin.

Auxiliary ligands for silver which can be used in the present invention include 2,2'-bipyrimidine; 1,2,4-triazole and derivatives thereof, e.g., 3-phenyl-5-thienyl-1,2,4-triazole; phosphines, e.g., triphenylphosphine; acyclic thioureas, e.g., N,N'-di-n-butylthiourea and tetramethylthiourea; 3,6-dithia-1,8-octanediol; 6-substituted purines wherein the 6-position is substituted with —OR or —NHR' where R is hydrogen, alkyl, or aryl and R' is alkyl, e.g., 6-methoxypurine and 6-dodecylaminopurine; and, bidentate nitrogenous ligands having two nitrogen atoms which are both available to coordinate to the same silver atom, e.g., 4-azabenzimidazole and derivatives thereof, 2,2'-dipyridyls including 2,2'-dipyridyl, 4,4'-dimethyl-2,2'-dipyridyl and 4,4'-diphenyl-2,2'-dipyridyl and 1,10-phenanthrolines including 1,10-phenanthroline, 5-chloro-1,10-phenanthroline and 5-nitro-1,10-phenanthroline.

When employed, the auxiliary ligand may be present in any layer of the heat-developable photosensitive or thermosensitive system of the present invention including the image-receiving layer. If present in a layer on the image-receiving layer, the layer also preferably contains a thermal solvent in which the ligand is soluble. Alternatively, water soluble ligands may be coated on the negative, i.e. on the layer comprising the photosensitive silver halide, before or after hardening of the gel has been accomplished. If the silver assisted cleavage of the particular color-providing compound tends to be slow, it is preferred that the auxiliary ligand be present in a layer other than the image-receiving layer.

The auxiliary ligands are generally used in amounts which yield, after drying, a coating coverage of 1 to 36 mmol/$m^2$, preferably 2 to 24 mmol/$m^2$.

Silver salt complexes which are suitable for use in the thermographic systems of the present invention include those silver salt complexes formed by the combination of a) one monovalent silver ion;

b) at least one coordinating ligand, the ligand(s) having all its available ligating sites coordinated to said one monovalent silver ion, said ligand(s) being sufficient to fully coordinate said silver ion, i.e., the silver ion is incapable if accepting lone pairs of electrons from any other potential donating atom or ligand; and, c) a monovalent anion having a silver binding constant of less than 1, said silver salt complex having a gross stability constant between 2.5 and 12 as described in the aforementioned copending U.S. patent application of J. R. Freedman et al, Ser. No. (C7779). Specific examples of the silver salt complexes falling within the above definition include silver(2,2'-bipyridyl)$_2$ toluate, silver(4,4'-dimethyl-2,2'-bipyridyl) octanesulfonate, silver(4,4'-diphenyl-2,2'-bipyridyl) tosylate, silver(2,2'-biquinoyl)$_2$ tosylate, silver(1,10-phenanthroline)$_2$ nitrate, silver(5-chloro-1,10-phenanthroline)$_2$ tosylate, and silver(5-nitro-1,10-phenanthroline)$_2$ tosylate.

The support for the image-recording elements according to the present invention must necessarily be able to withstand the heat required for processing the image, and any suitable support can be employed such as those described in Research Disclosure No. 17029, issued June 1978. Specific examples of suitable supports include synthetic plastic films, such as a polyester film, a polyvinyl chloride film or a polyimide film and paper supports, such as, photographic raw paper, printing paper, baryta paper and resin-coated paper. Preferably, a polyester film is used.

A subcoat may be added to the face of the support which carries the heat-developable materials in order to increase adhesion. For example, a polyester base coated with a gelatin subcoat has been found to enhance adhesion of aqueous based layers.

The heat-developable image-recording materials according to the present invention can be used to form monochrome or multicolor images. If the photosensitive, image-recording material is to be used to generate a full color-image, it generally has three different heat-developable light-sensitive layers each releasing a different color dye as a result of thermal development. For the thermographic image-recording materials, full color images may be obtained by using the three subtractive primaries: yellow, magenta and cyan. This may be achieved by employing three separate thermosensitive sheets, each designed to release a different diffusible dye. The image to be reproduced is generally separated into its blue, green and red components and each color record is printed in registration, using the corresponding thermosensitive sheet, on the same receiving sheet in a manner analogous to that used in conventional dye diffusion thermal transfer processes. See, for example, Advanced Printing of Conference Summaries, SPSE's 43rd Annual Conference, May 20–25, 1990, pp 266–268, SPSE, Springfield, Va., D. J. Harrison, *Thermal Dye Transfer Hard Copy Chemistry and Technology,* Eastman Kodak Company, Rochester, N.Y.

The heat-developable diffusion transfer image-recording materials of the present invention include those wherein the photosensitive silver halide emulsion layer(s) or the thermosensitive imaging layer(s) and the image-receiving layer are initially contained in separate elements which are brought into superposition subsequent to or prior to exposure. After development the two layers may be retained together in a single element, i.e., an integral negative-positive film unit or they can be peeled apart from one another. Alternatively, rather than being in separate elements, the photosensitive or thermosensitive layer(s) and the image-receiving layer may initially be in a single element wherein the negative and positive components are contained in a heat-developable laminate or otherwise retained together in an integral structure. After heat-development, the two layers may be retained together as a single element or they can be peeled apart from one another. Where the photosensitive silver halide emulsion or thermosensitive layer(s) and the image-receiving layer are retained together as an integral negative-positive film unit, a masking layer, e.g., titanium dioxide, may be necessary to conceal the untransferred color-providing material from the final image.

The photosensitive material of the present invention may be exposed by any of the methods used in the photographic art, e.g., a tungsten lamp, a mercury vapor lamp, a halogen lamp, fluorescent light, a xenon flash lamp or a light emitting diode including those which emit infrared radiation.

The photosensitive material of the present invention is heat-developed after imagewise exposure. This is generally accomplished by heating the material at a temperature in the range of 80° to 200° C., preferably in the range of 100° to 150° C., for a period of from 1 to 720 seconds, preferably 1.5 to 360 seconds. In order to transfer the released color-providing moiety to the image-receiving sheet, both heat and pressure must be applied simultaneously. Thus, pressure can be applied simultaneously with the heat required for thermal development by using heated rollers or heated plates. Alternatively, heat and pressure can be applied subsequent to thermal development in order to transfer the released color-providing moiety.

All methods of heating that can be employed in heat-developable photosensitive systems known in the art may be applied to the heat-developable photographic material of the present invention. Thus, for example, heating may be accomplished by using a hot plate, an iron, heated rollers or a hot drum.

For thermographic applications, heat is generally applied so as to obtain temperatures in the range of 80° to 200° C., preferably in the range of 100° to 150° C. The way in which the heat is applied or induced imagewise may be realized in a variety of ways, for example, by direct application of heat using a thermal printing head or thermal recording pen or by conduction from heated image-markings of an original using conventional thermographic copying techniques. Selective heating can be produced in the heat-sensitive element itself by the conversion of electromagnetic radiation into heat and preferably, the light source is a laser beam emitting source such as a gas laser or semiconductor laser diode. The use of a laser beam is not only well suited for recording in a scanning mode but by utilizing a highly concentrated beam, radiant energy can be concentrated in a small area so that it is possible to record at high speed and high density. Also, it is a convenient way to record data as a heat pattern in response to transmitted signals such as digitized information and a convenient way of preparing multicolor images by employing a plurality of laser beam sources that emit laser beams of different wavelengths.

If using an infrared emitting laser, the thermographic material also contains an infrared absorbing substance for converting infrared radiation into heat. Obviously, the infrared absorber should be in heat-conductive relationship with the thermosensitive materials, for example, in the same layer as the color-providing material or in an adjacent layer. The infrared absorber may be an inorganic or organic compound, such as, a cyanine, merocyanine, squarylium or thiopyrylium dye and preferably, is substantially non-absorbing in the visible region of the electromagnetic spectrum.

Any image-receiving layer which has the capability of receiving the color-providing moiety released as a result of thermal development may be used in the thermographic and photothermographic imaging materials of the present invention. Typical image-receiving layers which can be used are prepared by coating a support material with a suitable polymer for receiving the color-providing moiety. Alternatively, certain polymers may be used as both the support and the receiving material.

The image-receiving layer is generally superposed on the photosensitive negative after exposure and the two are then heated simultaneously to develop the image and cause the color-providing moiety to transfer. Alternatively, the negative may be exposed and then processed with heat, followed by superposing the image-receiving sheet on the exposed and developed photosensitive material and applying heat and pressure to transfer the color-providing moiety. For thermographic imaging materials, the image-receiving layer is generally superposed on the thermosensitive imaging layer prior to heating and the two are then heated simultaneously to provide the image and cause the color-providing moiety to transfer. For both photothermographic and thermographic imaging materials, the image-receiving layer is then generally peeled apart from the heat-sensitive layers.

Suitable polymers to be coated on the image-receiving support to receive the color-providing moiety include polyvinyl chloride (PVC), poly(methyl methacrylate), polyester, and polycarbonate. The preferred polymer is PVC.

The support materials which may be used for the image-receiving layer can be transparent or opaque. Examples of suitable supports are polymer films, such as, polyethylene terephthalate, polycarbonate, polystyrene, polyvinyl chloride, polyethylene, polypropylene and polyimide. The above supports can be made opaque by incorporating pigments therein, such as, titanium dioxide and calcium carbonate. Other supports include baryta paper, resin coated paper comprising paper laminated with pigmented thermoplastic resins, fabrics, glass, and metals.

Resin coated paper has been found to be a particularly useful support material for the image-receiving layer according to the present invention.

Additionally, the heat-developable image-recording materials of the present invention may include other materials heretofore suggested in the art but are not essential. These include, but are not limited to, antifoggants, antistatic materials, coating aids e.g, surfactants, activators and the like.

Also, the photosensitive elements may contain additional layers commonly used in the art, such as spacer layers, a layer of an antihalation dye, and/or a layer of a filter dye arranged between differentially color-sensitive emulsion layers. A protective layer may also be present in any of the image-recording materials of the present invention. The protective layer may contain a variety of additives commonly employed in the photographic art. Suitable additives include matting agents, colloidal silica-, slip agents, organofluoro compounds, UV absorbers, accelerators, antioxidants, etc.

The present invention is illustrated by the following photothermographic and thermographic examples.

In the following Examples, the silver iodobromide dispersion is a 0.25 μm cubic unsensitized iodobromide (2% iodide) emulsion prepared by standard techniques known in the art. The silver salt oxidizer, thermal solvent, color-providing material and reducing agents used in the Examples were added to the coating compositions as dispersions. The various dispersions were prepared by the specific procedures described below or by analogous procedures but using different reagents. The 1,2,4-triazole, glyoxal and succinaldehyde when added were added to the coating compositions as aqueous solutions.

(1) Silver Salt Dispersion 415 g of benzotriazole was added to 325 mL of concentrated ammonium hydroxide. To the resulting solution was added 450 g of gelatin-and the mixture was diluted to a total volume of 6 liters with water. To this mixture, in the dark and at 40° C., was added a mixture prepared by combining 550 g of silver nitrate with 500 mL of concentrated ammonium hydroxide and diluted to a total volume of 2.1 liters with water. After the addition was complete, the material was washed using standard emulsion washing procedures and the pH adjusted to 6 and the pAg adjusted to 7.4.

(2) Thermal Solvent Dispersion 64 g of the thermal solvent designated TS-1, above, was dispersed in a mixture of 8.8 g of 10% aqueous polyvinylpyrrolidone, 10.8 g of 5% aqueous Alkanol XC (available from DuPont, Wilmington, Del.), and 160.4 g of water. The resulting mixture was ground in a ball mill for 7 hours. 100 g of water was introduced for washing purposes during the isolation of the dispersion.

(3) Dispersion of Color-Providing Material 1.6 g of the color-providing material of Formula (i) was dissolved in 5.0 g of ethyl acetate. 0.8 g of tricresylphosphate was added and the mixture was stirred and heated to 42° C. To the mixture at 42° C. was added a solution containing 21 g water, 4 g of 5% aqueous Alkanol XC and 8.5 g of 17.5% aqueous gelatin. The mixture was sonified with an ultrasonic probe for one minute in order to form a dispersion. The dispersion was stirred at 60° C. for 20 minutes to remove the ethyl acetate, followed by the addition of 14.1 g water.

(4) Reducing Agent Dispersion 3.0 g of 4-hydroxymethyl-4-methyl-1-phenyl-3-pyrazolidone (Dimezone-S) was added to 4.0 g of water and 3.0 g of 5% aqueous Alkanol XC. The resulting mixture was ground in a ball mill for 16 hours. The dispersion was diluted with water during isolation.

EXAMPLE 2

A heat-developable photosensitive material was prepared using the dispersions described above. A gelatin subcoated 4 mil polyester film (available from DuPont) was coated using a #30 Meyer Rod with an aqueous composition prepared in order to yield dry coating coverages of the respective components of layer 1 as follows:

| Layer 1 | |
|---|---|
| Gelatin<br>(Inert, deionized, derivatized bone gelatin, available from Rousselot, France) | 2000 mg/$m^2$ |
| Color-providing material<br>(Compound of Formula (i)) | 653 mg/$m^2$ |
| Zonyl FSN<br>(perfluoroalkyl polyethylene oxide non-ionic surfactant, available from DuPont, Wilmington, DE) | 0.1% by wt. |

After air drying, layer 1 was overcoated with a composition (applied with a #30 Meyer Rod) prepared in order to yield coated coverages of the respective components of layer 2 as follows:

| Layer 2 | |
|---|---|
| Gelatin | 3000 mg/$m^2$ |
| Thermal Solvent (TS-1) | 3000 mg/$m^2$ |
| Reducing Agent (Dimezone S) | 4.0 mmol/$m^2$ |
| Silver Benzotriazole | 2.0 mmol/$m^2$ |
| Silver Iodobromide | 2.0 mmol/$m^2$ |
| Succinaldehyde | 100 mg/$m^2$ |
| Zonyl FSN | 0.1% by wt. |

The heat-developable photosensitive material was exposed to white light for $10^{-3}$ sec. An image-receiving sheet comprising a resin coated paper base overcoated with polyvinylchloride (12 g/$m^2$) was superposed on the exposed, heat-developable photosensitive material and the assembly was processed at 120° C. for 180 sec at a pressure of 35 psi using a heated plate.

The photosensitive layer and color-providing layer were peeled apart from the image-receiving layer after cooling below the melting point of the thermal solvent (104° C.), approximately 5 sec after processing. The maximum blue reflection density (Dmax) and the minimum density (Dmin) of the resulting image were measured using a reflection densitometer (MacBeth, model RD 514). The measured values are reported in Table 1.

TABLE 1

| | Dmax | Dmin |
|---|---|---|
| EXAMPLE 2 | 0.84 | 0.72 |

EXAMPLE 3

Example 2 was repeated except that 452 mg/$m^2$ of the color-providing material of Formula (iii) was used in place of the color-providing material of Formula (i) and triazole was added to layer 2 to in an amount calculated to yield a coverage of 12 mmol/$m_2$. The measured Dmax and Dmin values are reported in Table 2.

TABLE 2

| | Dmax | Dmin |
|---|---|---|
| EXAMPLE 3 | 0.94 | 0.78 |

EXAMPLE 4

Five 2-layer heat-developable thermographic imaging materials were prepared as in Example 2 except that the photosensitive silver iodobromide and the reducing agent were left out and the color-providing materials of Formulae (i)-(v), respectively were used. The materials were imaged by heating; there was no exposure to light. The coated coverages of the respective components of layer 1 and layer 2 were as follows:

| Layer 1 | |
|---|---|
| Gelatin | 2000 mg/$m^2$ |
| Color-providing compound | 0.5 mmol/$m^2$ |
| Thermal Solvent (TS-1) | 1500 mg/$m^2$ |
| Zonyl FSN | 0.1% by wt. |

| Layer 2 | |
|---|---|
| Gelatin | 3000 mg/$m^2$ |
| Thermal Solvent (TS-1) | 3000 mg/$m^2$ |
| Silver Benzotriazole | 2.0 mmol/$m^2$ |

-continued

| Layer 2 | | |
|---|---|---|
| Succinaldehyde | 100 | $mg/m^2$ |
| 1,2,4-Triazole | 12.0 | $mmol/m^2$ |
| Zonyl FSN | 0.1% | by wt. |

The imaging material which employed the color-providing compounds of Formulae (i) and (iii) did not contain any thermal solvent in layer 1.

The image-receiving sheets were prepared as in Example 2. The image-receiving sheets were superposed on the respective heat-developable materials and each was processed at 120° C. for 180 sec. at a pressure of 35 psi by using heated plates. The maximum optical reflection density was measured for each material and they are reported in Table 3. The measured Dmin for each material was 0.05.

TABLE 3

| COLOR-PROVIDING MATERIAL | Dmax |
|---|---|
| Compound of Formula (i) | 0.28 |
| Compound of Formula (ii) | 0.71 |
| Compound of Formula (iii) | 0.23 |
| Compound of Formula (iv) | 0.75 |
| Compound of Formula (v) | 0.94 |

Examples 2–4 demonstrate that the color-providing compounds according to the present invention provide color images in heat-developable photographic and thermographic imaging systems.

The heat-developable materials prepared and processed in Examples 2–5 were processed base-free, i.e., they did not contain any added base or base-precursor and they were processed water-free, i.e., no water was added to aid in development or transfer. It is recognized what while the auxiliary ligand, 1,2,4-triazole, used in the examples may be classified as a weak base, it would not be considered to be a base or base-precursor as those terms are used in Japanese Kokai No. 59-180548. However, as stated earlier, the color-providing compounds of the present invention may also be used in heat-developable imaging materials containing a base or base-precursor such as disclosed in the aforementioned Japanese Kokai No. 59-180548.

Since certain changes may be made in the above subject matter without departing from the spirit and scope of the invention herein involved, it is intended that all matter contained in the above description and the accompanying examples be interpreted as illustrative and not in any limiting sense.

We claim:

1. A dye-providing compound represented by the formula:

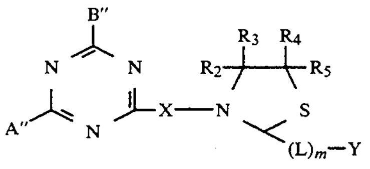

wherein:

L represents a divalent organic linking group containing at least one carbon atom; m is 0 or 1; X represents a divalent chemical linkage joining the cyclic 1,3-sulfur-nitrogen moiety to the triazine group; A'' and B'', the same or different, each represent hydrogen, halo, amino, hydroxy, alkoxy, alkyl, a ballast group for rendering said dye-providing compound substantially non-diffusible during processing or

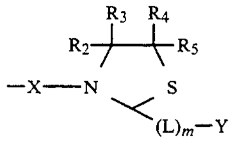

provided at least one A'' or B'' is a ballast group or

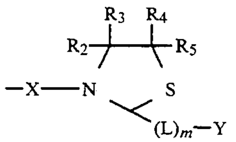

$R_2$, $R_3$, $R_4$ and $R_5$ are each hydrogen, alkyl, or taken together, $R_2$ and $R_3$ or $R_4$ and $R_5$ represent a substituted or unsubstituted carbocyclic or heterocyclic ring, and Y represents a dye radical or dye intermediate.

2. A compound according to claim 1 wherein A'' and B'', the same or different, represent a ballast group or a group represented by the formula:

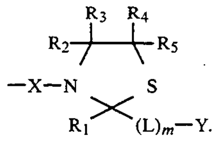

3. A compound according to claim 1 wherein L represents an alkyl group and m is 1.

4. A compound according to claim 1 wherein Y is represented by one of the following formula:

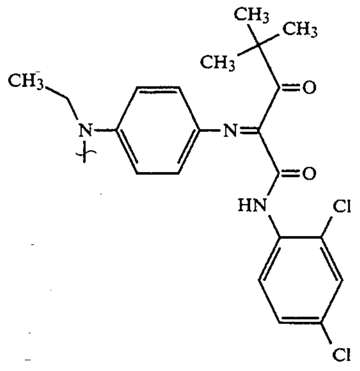

(a)

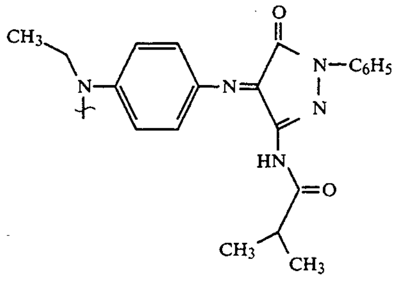

(b)

-continued (c)

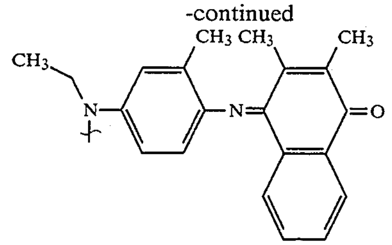

(d)

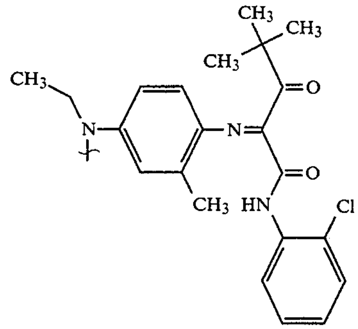

(e)

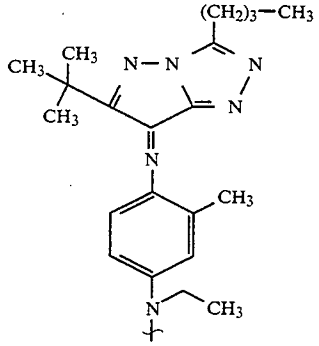

(f)

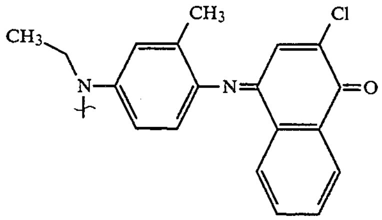

(g)

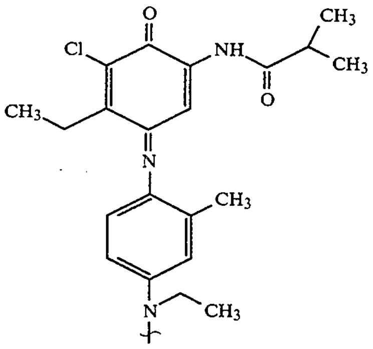

wherein  represents the point of attachment to L.

5. A compound according to claim 1 wherein Y is selected from the following dye radicals: nitro, thiazole, cyanine, di- and triphenylmethane, anthrapyridone, azo anthraquinone, phthalocyanine, azomethine, indoaniline, indamine, and indophenol.; and metal complexed azo, azomethine and phthalocyanine.

6. A compound according to claim 1 wherein Y is selected form the following dye radicals: azomethine, indoaniline, indamine, and indophenol.

7. A dye-providing compound represented by the formula:

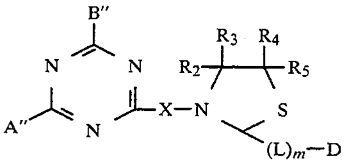

wherein:

L is a divalent organic linking group containing at least one carbon atom and is selected from: alkyl, cycloalkyl, aralkyl, alkaryl, —CONH—, alkyl—CONH—, and aryl—CONH—; m is 0 or 1; $R_2$, $R_3$, $R_4$, and $R_5$, the same or different, are selected from hydrogen and methyl; D is a dye radical selected from:

(a)

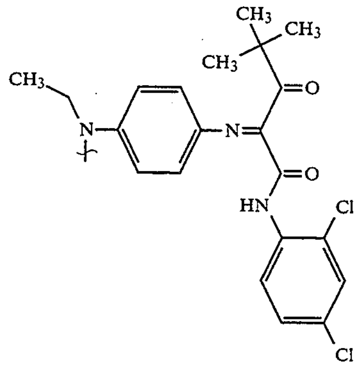

(b)

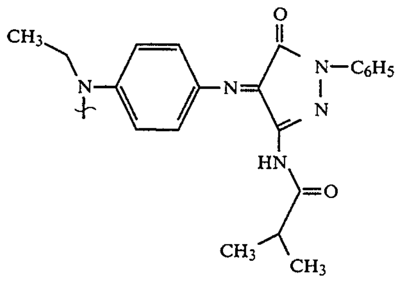

(c)

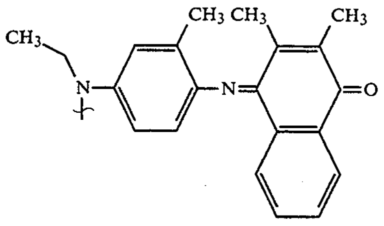

-continued

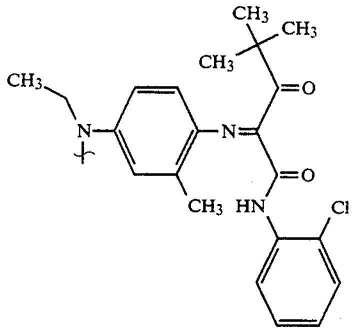

(d)

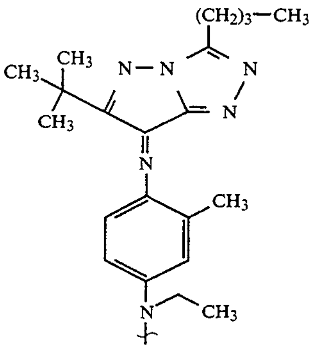

(e)

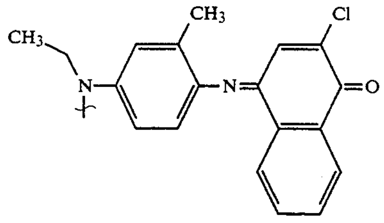

(f)

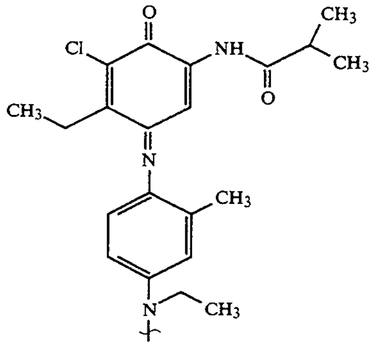

(g)

wherein represents the point of attachment to L;

X is a divalent chemical linkage joining the cyclic 1,3-sulfur-nitrogen moiety to the triazine group and is selected from: —NH—R—NH—CO—R—, —NH—R—NH—CO—R'—, —NH—CO—R—, —NH—R—NH—, —O—R—NH—, —O—R—O, —O—R—O—CO—, —R—, —R—O—R—, —R—O—R'—, wherein R and R' are alkyl or aryl containing from 1 to 20 carbon atoms; and A'' and B'', the same or different, are selected from: hydrogen, halo, amino, hydroxy, alkoxy, alkyl, a ballast group for rendering said dye-providing compound substantially non-diffusible during processing, or

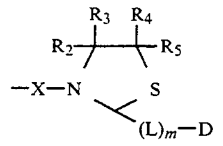

provided at least one of A'' or B'' is a ballast group or

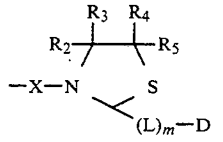

8. A compound according to claim 1 represented by

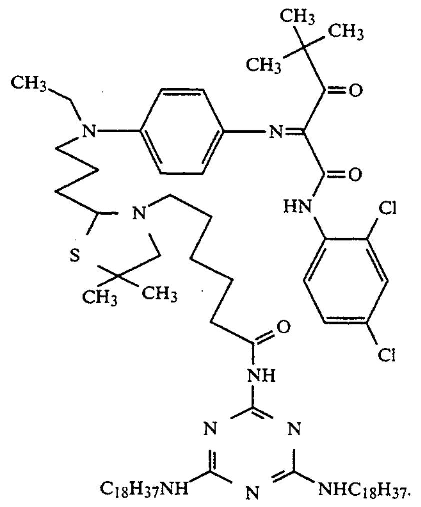

9. A compound according to claim 1 represented by

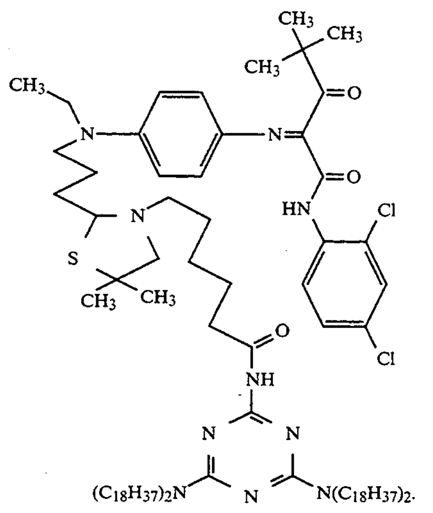

10. A compound according to claim 1 represented by

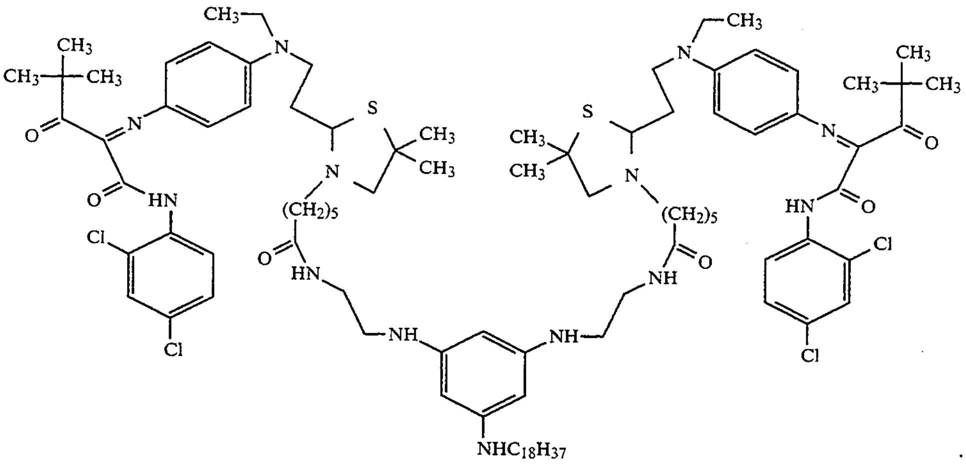
11. A compound according to claim 1 represented by
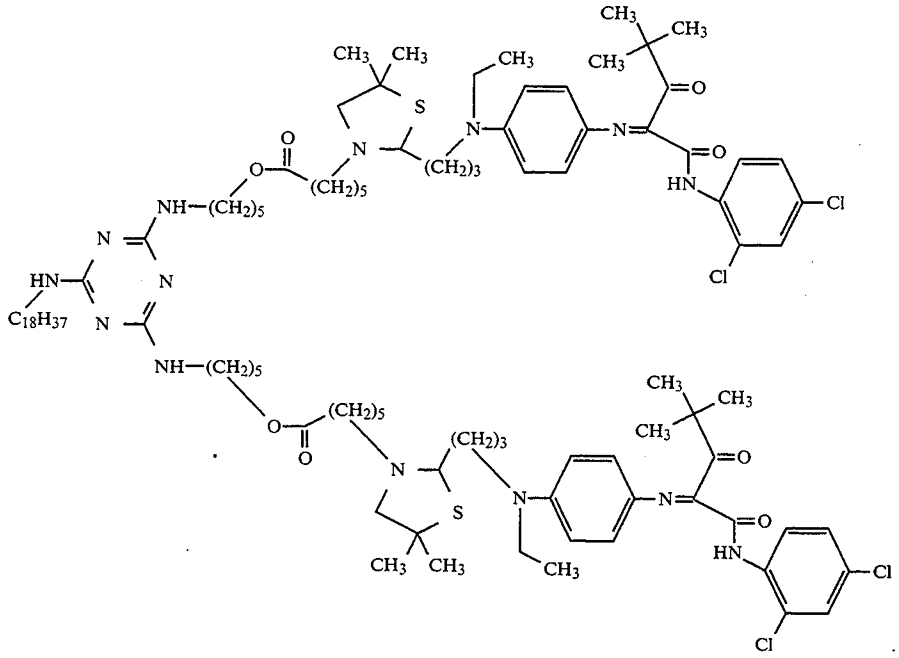
12. A compound according to claim 1 represented by
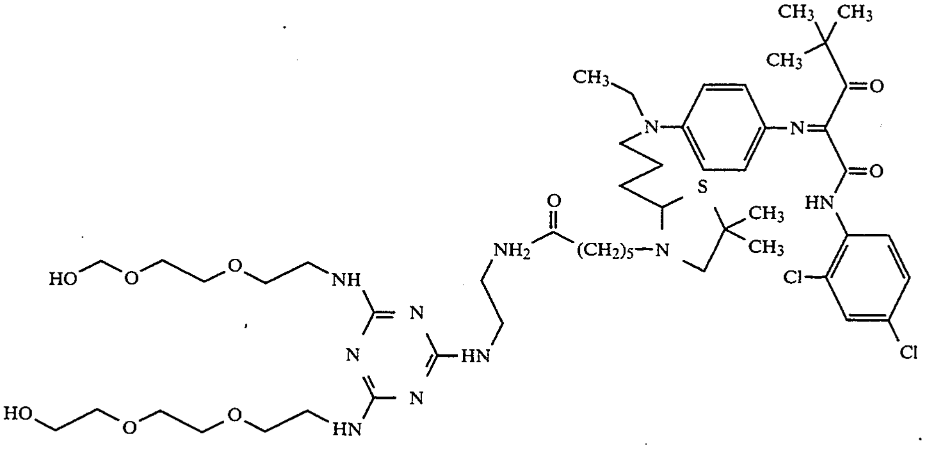
* * * * *